United States Patent
Cohen et al.

(10) Patent No.: US 6,720,390 B2
(45) Date of Patent: Apr. 13, 2004

(54) PROCESS FOR CROSSLINKING OF ACRYLIC ESTER COPOLYMERS

(75) Inventors: Gordon Mark Cohen, Wynnewood, PA (US); Jerald Rice Harrell, Wilmington, DE (US); Edward Johson Deyrup, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 75 days.

(21) Appl. No.: 10/117,380

(22) Filed: Apr. 5, 2002

(65) Prior Publication Data
US 2002/0151657 A1 Oct. 17, 2002

Related U.S. Application Data

(60) Provisional application No. 60/284,048, filed on Apr. 16, 2001.

(51) Int. Cl.$^7$ .............................................. C08F 120/10
(52) U.S. Cl. ................ 525/330.6; 525/328.6; 525/329.2; 525/329.5; 525/329.8; 525/330.3; 526/318; 526/319; 526/324; 526/329.7; 526/330; 526/331
(58) Field of Search ............................ 525/328.8, 329.2, 525/329.5, 329.8, 330.3, 330.6; 526/318, 319, 324, 329.7, 330, 331

(56) References Cited

U.S. PATENT DOCUMENTS

| | | | |
|---|---|---|---|
| 3,396,152 A | 8/1968 | Henning et al. | |
| 3,715,027 A | 2/1973 | Fujimoto | |
| 5,589,550 A | * 12/1996 | Manley et al. | ............... 525/282 |

FOREIGN PATENT DOCUMENTS

| | | |
|---|---|---|
| EP | 0 181 408 A1 * | 5/1986 |
| EP | 0458164 | 11/1991 |
| EP | 0679663 | 11/1995 |
| GB | 1044773 | 10/1966 |
| WO | WO 90/10654 | 9/1990 |

* cited by examiner

*Primary Examiner*—Robert DeShon Harlan

(57) ABSTRACT

Disclosed is a process for crosslinking copolymers of acrylic esters by converting some of the ester groups to ester or amide groups which contain unsaturation, and then sulfur or peroxide curing the resulting polymers. The resulting crosslinked polymers often have excellent vulcanizate properties, and are useful especially in elastomeric form as seals and gasket.

25 Claims, No Drawings

PROCESS FOR CROSSLINKING OF ACRYLIC ESTER COPOLYMERS

FIELD OF THE INVENTION

Copolymers of acrylic esters are crosslinked by converting some of the ester groups to ester or amide groups which contain unsaturation and then sulfur or peroxide curing the resulting polymers.

TECHNICAL BACKGROUND

Crosslinking (also sometimes termed vulcanization or curing) of polymers yields products which often have improved properties for their intended uses. This is particularly true when the polymer is an elastomer, and curing of elastomers is very commonly done, for instance using sulfur or peroxide curing. For sulfur cures, generally speaking the polymer contains olefinic unsaturation, while for peroxide curing the presence of olefinic unsaturation is often preferable, see for instance H. Mark, et al., Ed., Encyclopedia of Polymer Science and Engineering, Vol. 17, McGraw-Hill Book Co., New York, 1989, p. 666–698.

However, some types of elastomers do not contain olefinic unsaturation, and so are not generally sulfur cured, and/or cured by peroxides with some difficulty. These elastomers are cured using other curing systems. For example, elastomeric ethylene/acrylic copolymers may be crosslinked by the use of primary diamines, which form crosslinks, see for instance H. Mark, et al., Ed., Encyclopedia of Polymer Science and Engineering, Vol. 1, McGraw-Hill Book Co., New York, 1985, p. 325–334. In order to aid in such crosslinking to more readily form crosslinks and/or form more stable crosslinks curesite monomers, such as carboxylic acids or half acid esters may be copolymerized into the polymer, see for instance U.S. Pat. Nos. 3,883,472 and 3,904,588. In another example, polyacrylate elastomers are typically crosslinked through curesites containing chlorine, epoxy, and/or carboxylic acid groups. These curesites may be obtained from curesite monomers which are copolymerized into the polymer, for example, 2-chloroethyl vinyl ether, vinyl chloroacetate, p-vinylbenzyl chloride, or glycidyl acrylate, see for instance Kirk-Othmer Encyclopedia of Chemical Technology, 4th edition, Vol. 8, John Wiley and Sons, New York, 1993 p. 927 and Polymeric Materials Encyclopedia, Vol. 1, CRC Press, New York, 1996, p.74.

However, it is often desirable to crosslink such polymers using conventional sulfur or peroxide curing systems such as are widely employed in the art, because such cures are already in use in many factories for a wide variety of common elastomers, and/or the curing agents are less expensive and/or less toxic. In order to make such types of polymers curable with those peroxide or sulfur cure systems, it is desirable to introduce into them olefinic unsaturation containing groups. These groups should be introduced in such a way so as not to harm the basic polymer properties, so that the polymers may be readily and/or economically cured, and/or the resulting crosslinks are stable, so as to give good vulcanizate properties.

In order to form polyacrylate elastomers it is known to introduce olefinic unsaturation by copolymerization with comonomers such as butadiene, isoprene, allyl maleate, dicyclopentenyl acrylate, 5-ethylidene-2-norbornene, or tetrahydrobenzyl acrylate. These monomers are expensive and in some cases may cause the polymer to prematurely crosslink in the polymerization reaction, see for instance Kirk-Othmer Encyclopedia of Chemical Technology, 4th edition, Vol. 8, John Wiley and Sons, New York, 1993, p. 928.

It is also possible to introduce olefinic unsaturation containing groups by chemical modification of the polymer after the polymerization. Japanese Patent Application 62-121746 describes the esterification of a polymer made from ethylene, an acrylic ester and maleic anhydride and/or a maleic half acid ester which is "modified" with an olefinically unsaturated amine or alcohol, and then cured using a sulfur or peroxide cure. No mention is made of polymers containing acrylic ester repeat units.

German Patent Application 3,715,027 A1 describes various copolymers of ethylene and acrylic acids and/or esters, and optionally other monomers such as maleic anhydride, their reaction with olefinic alcohols, including those with polyunsaturation, and their subsequent crosslinking by oxidation, e.g., reaction with air, often in the presence of an oxidation catalyst. The polymers are useful as thermosetting melt adhesives. No mention is made of sulfur or peroxide curing. U.S. Pat. No. 5,736,616 is similar to German Patent Application 3,715,027, in that a polymer containing pendant unsaturation is used as an oxygen scavenger (react with oxygen). The polymer is made by polymerizing ethylene and acrylic esters and/or acids and then esterifying or transesterifying the resulting polymer with an unsaturated alcohol. No mention is made of curing such a polymer using a sulfur or peroxide cure.

U.S. Pat. No. 5,093,429 describes the preparation of a polymer containing olefinic unsaturation by direct copolymerization of ethylene, an acrylic ester, and a copolymerizable monomer containing unsaturation which survives the polymerization (for example has a copolymerizable double bond and a double bond which is unreactive in the polymerization), or by copolymerization of ethylene, and acrylic ester, and another copolymerizable monomer which may then be reacted with an unsaturated alcohol or amine to attach such unsaturation to the polymer. The polymer containing unsaturation may then be crosslinked using a sulfur or peroxide curing system. No mention is made of using the acrylic ester as a site to attach the olefinic unsaturation.

In some instances the crosslinks that result from curesite monomers present in some of the above references are not as stable as desired because linkages between the crosslinkable groups (e.g., olefinic unsaturation) are not as stable as desired. U.S. Pat. No. 4,399,263, for example, mentions that at temperatures above 160° C. ethylene/alkyl acrylate/maleic acid ester polymers form anhydride moieties by internal reaction at the acid-ester curesite. The crosslinks may not be sufficiently stable because the curesite monomers and/or polymer-modifying reagents, which attach curable functionalities onto the polymer, introduce groups into the composition which catalyze unwanted reactions.

SUMMARY OF THE INVENTION

This invention concerns a process for crosslinking a polymer, comprising:

(a) transesterifying or amidating a first polymer consisting essentially of about 60 or more mole percent of

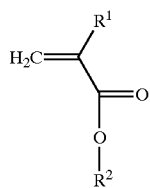

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, with an alcohol or a primary amine which contains one or more olefinic bonds, to form a second polymer having side chains containing said olefinic bonds; and (b) crosslinking said second polymer using a sulfur or peroxide cure system; and wherein:
$R^1$ is methyl or hydrogen; and
$R^2$ is hydrocarbyl, substituted hydrocarbyl, or a mixture thereof.

Also disclosed herein is a composition comprising:

(a) a second polymer made by transesterifying or amidating a first polymer consisting essentially of about 60 or more mole percent of

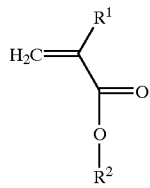

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, with an alcohol or a primary amine which contains one or more olefinic bonds; and (b) a sulfur or peroxide cure system; and wherein:
$R^1$ is methyl or hydrogen; and
$R^2$ is hydrocarbyl, substituted hydrocarbyl, or a mixture thereof.

Another composition disclosed herein comprises:

(a) a polymer consisting essentially of about 60 or more mole percent of

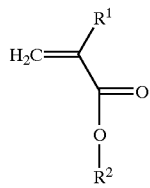

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons; and (b) a sulfur or peroxide cure system; and wherein:
$R^1$ is methyl or hydrogen; and
$R^2$ is hydrocarbyl, substituted hydrocarbyl, or a mixture thereof provided that at least 0.5 mole percent of $R^2$ contains olefinic unsaturation.

DETAILS OF THE INVENTION

Herein certain terms are used, and they are defined below.

By hydrocarbyl is meant a univalent radical containing only carbon and hydrogen. Unless otherwise specified it is preferred that it contain 1 to 30 carbon atoms.

By substituted hydrocarbyl is meant hydrocarbyl containing one or more substituents (functional groups) which do not interfere with (as appropriate) amidation, transesterification and crosslinking. Useful substituents include oxo (keto), halo, ether and thioether. Unless otherwise specified it is preferred that it contain 1 to 30 carbon atoms.

By a hydrocarbon olefin is meant a polymerizable olefin containing only carbon and hydrogen.

By olefinic double bond is meant a carbon-carbon double bond which is not part of an aromatic ring. Preferably the olefinic double bond has one or more allylic hydrogen atoms, particularly when a peroxide cure is used.

By an acrylic ester is meant a compound of formula (I).

By a dipolymer is meant a copolymer containing repeat units derived from two monomers.

By a conventional sulfur cure system is meant any of the conventional known cure systems that cure unsaturated polymers using sulfur chemistry, see for instance H. Mark, et al., Encyclopedia of Polymer Science and Engineering, Vol. 17, McGraw-Hill Book Co., New York, 1989, p. 666–698, and W. Hoffmann, Vulcanization and Vulcanizing Agents, MacLaren & Sons, Ltd., London, 1967, both of which are hereby included by reference. The cure system may include conventional accelerators and other compounds, and may or may not have free sulfur present.

By a peroxide cure system is meant any of the conventional known cure systems that cure unsaturated polymers (they may also cure polymers containing no unsaturation) using organic peroxides, see for instance W. Hoffmann, Vulcanization and Vulcanizing Agents, MacLaren & Sons, Ltd., London, 1967, which is hereby included by reference. Besides the peroxide being present, other conventional ingredients such as so-called coagents may also be present.

By elastomeric or an elastomer is meant that the heat of fusion of any polymer crystallites present with a melting point (Tm) of 50° C. or more is less than 5 J/g, more preferably less than about 2 J/g, and preferably no polymeric crystallites are present at 25° C., and that the glass transition temperature (Tg) of the polymer is less than about 50° C., more preferably less than about 20° C., and especially preferably less than about 0° C. The Tm and heat of fusion of the polymer are determined by ASTM method D3451 at a heating rate of 10° C./min and the Tm is taken as the peak of the melting endotherm, while the Tg of the polymer is determined using ASTM Method E1356 at a heating rate of 10° C./min, taking the midpoint temperature as the Tg. Both of these are determined on a second heating of the polymer.

The first polymer of the present invention consists essentially of acrylate monomer units according to formula (I), and up to 40 mol % of non-acrylate monomer units. In (I), preferably, $R^1$ is hydrogen, and $R^2$ is hydrocarbyl, more preferably, alkyl containing 1 to 8 carbon atoms optionally substituted by ether oxygen. It will be understood by one of skill in the art that the acrylate moiety of the first polymer may be a mixture of acrylate monomers; that is, not all the $R^2$ groups in the polymer need be the same. In a preferred embodiment, the $R^2$ groups are ethyl or butyl, or a combination of the two. It is well-known in the art to employ up to about 50 mol % of additional acrylate monomers in combination with ethyl or butyl acrylate, to effect one or another desired modification to the properties of the resultant polymer. Preferred additional acrylate monomers include methoxy ethyl acrylate, ethoxy ethyl acrylate, and mixtures thereof. Also preferably the first polymer is elastomeric.

The first polymer of the invention may further be a copolymer of one or more acrylate monomers with up to 40 mol % of non-acrylate monomers selected from the group consisting of aromatic hydrocarbon olefins, acrylonitrile, olefinic curesite monomers containing chlorine, epoxy, or carboxylic acid groups, and cyanoalkyl acrylates wherein alkyl comprises 2–8 carbons. Acrylonitrile is a preferred non-acrylate comonomer.

Useful monomers that contain chlorine, epoxy, or carboxylic acid groups include 2-chloroethyl vinyl ether, vinyl chloroacetate, p-vinylbenzyl chloride, acrylic acid, methacrylic acid, allyl glycidyl ether, glycidyl acrylate, and glycidyl methacrylate. Useful aromatic hydrocarbon olefins include styrene, α-methylstyrene, and substituted styrenes.

Useful alcohols which contain olefinic bonds include alcohols of the formula $H(CH_2)_pCH=CH(CH_2)_qCH_2OH$, (II), wherein p is 0 or an integer of 1 to 10, and q is 0 or an integer of 1 to 30, $HR^3(CR^4=CR^5R^6)_tCH_2OH$ (III) wherein $R^3$ and each $R^5$ are each independently a covalent bond, alkylene or alkylidene, and $R^4$ and $R^6$ are each independently hydrogen or alkyl, wherein $R^3$, $R^4$, $R^5$ and $R^6$ each independently contain 1 to 20 carbon atoms, and t is 1, 2 or 3. (II) is a preferred alcohol, and in (II) it is preferred that p is 0 and/or q is 5 to 17, or p is 8 and q is 7. It is preferred that these alcohols be primary or secondary alcohols, and more preferred that they be primary alcohols. Mixtures of alcohols may be used, for example a mixture of oleyl, linoleyl and linolenyl alcohols. Specific preferred alcohols include 10-undecen-1-ol, oleyl alcohol, cis-3,7-dimethyl-2,6-octadien-1-ol and 3-methyl-2-butenol.

Useful primary amines which contain olefinic bonds include amines of the formula $H(CH_2)_pCH=CH(CH_2)_q$ $CH_2NH_2$, (IV), wherein p is 0 or an integer of 1 to 10, and q is 0 or an integer of 1 to 30, $HR^3(CR^4=CR^5R^6)_tCH_2NH_2$ (V) wherein $R^3$ and each $R^5$ are each independently a covalent bond, alkylene or alkylidene, and $R^4$ and $R^6$ are each independently hydrogen or alkyl, wherein (when applicable) $R^3$, $R^4$, $R^5$ and $R^6$ each independently contains 1 to 20 carbon atoms, and t is 1, 2 or 3. (IV) is a preferred primary amine, and in (IV) it is preferred that p is 0 and/or q is 5 to 17, or p is 8 and q is 7.

Since the reaction of the unsaturated alcohol or primary amine with the first polymer is usually run at elevated temperatures, and it is preferable that the alcohol or amine not be volatilized before it has a chance to react with the first polymer, it is preferred that the boiling point of this compound be high enough so that volatilization will be relatively slow. This of course means that the molecular weight of the amine or alcohol be such that the boiling point is relatively high. Thus it is preferred that the atmospheric boiling point (if necessary extrapolated from a boiling point at lower pressure) of the unsaturated primary amine or unsaturated alcohol be above the process temperature, more preferably at least about 50° above, for reaction of the first polymer [step (a)]. The olefinically unsaturated alcohol is a preferred reactant with the first polymer.

The first polymer is reacted with an olefinically unsaturated alcohol and/or primary amine to form a polymer in which the olefinically unsaturated alcohol and/or primary amine becomes a side chain on the polymer (forming the second polymer). If an alcohol is used, a transesterification takes place, replacing the —$OR^2$ group with a group derived from the alcohol (the alcohol minus the hydroxyl hydrogen atom). If a primary amine is used, an amidation takes place, replacing the —$OR^2$ group with a group derived from the primary amine (the primary amine minus one of the hydrogen atoms on the amino nitrogen atom). The total amount of alcohol and/or amine added to the reaction with the first polymer will depend upon the degree of transesterification and/or amidation desired and the percentage of alcohol and/or primary amine actually reacted with the first polymer. Typically this will range from 0.1 to 100 mole percent of the repeat units (I) present in the first polymer used, preferably 0.1 to about 50 mole percent, more preferably about 0.1 to about 35 mole percent, and especially preferably about 1 to about 20 mole percent of (I). To increase the rate of reaction, the amount of alcohol and/or amine added can exceed 100% of (I), but this may have other consequences (see below).

The reaction of the first polymer may be carried out at any temperature at which the transesterification and/or amidation takes place, a range of about 100° C. to about 350° C., preferably about 140° C. to about 280° C., and more preferably about 180° C. to about 260° C., being useful. The temperature should preferably not exceed a temperature at which significant decomposition of the polymer takes place. The temperature which is needed may be affected by the use of a catalyst for the transesterification or amidation reaction. Any of the catalysts conventionally useful for these reactions may be used, provided it does not stop the subsequent crosslinking of the polymer. For instance, known transesterification catalysts such as alkyl titanates, zinc acetate, alkali metal alkoxides, dibutyltin dilaurate, stannous octoate, butylstannoic acid, and (other) Ti, Sn, Zn, Mn and Pb compounds may be used. Some compounds such alkali metal alkoxides (see U.S. Pat. No. 5,656,692 for the use of this type of transesterification catalyst) may slow the crosslinking reaction. Preferred catalysts are tetralkyl titanates such as tetrabutyl titanate, and dibutyltin dilaurate. Typical amounts of catalyst may be used, for example 0.03 to 5 weight percent of the first polymer, more typically 0.1 to 2 weight percent of the first polymer. The catalyst may be dissolved in a small amount of an inert liquid compound or a portion of the olefinically unsaturated compound in order to mix it with the first polymer. Inert liquids include aromatic hydrocarbons such as xylene, 1,2,3,4-tetramethylbenzene, and isodurene, and chlorinated hydrocarbons such as o-dichlorobenzene. The use of these catalysts often reduces the temperatures and/or times required for the reaction to take place.

Since the transesterification reactions are equilibrium reactions to drive them to completion it may be preferable to remove the byproduct alcohol $R^2OH$ from the reaction. This can be done by allowing this (usually volatile) alcohol to volatilize. Vacuum may be applied and/or an inert gas sweep used to help remove this byproduct. An inert gas atmosphere may also help prevent discoloration and/or other degradation during the reaction.

The transesterification/amidation may be carried out in a variety of ways. To ensure complete mixing of the alcohol and/or amine and the first polymer all of these materials (and catalyst if present) may be dissolved in a solvent and the byproduct alcohol distilled from the solution. While this may be a good way of ensuring uniform reaction, dissolution of polymers and their recovery from solution is often an expensive process, so other methods may be desirable. One method is to heat the polymer while mixing it (at a temperature above its melting point and/or Tg, if any) in a polymer mixing apparatus. While the polymer is being kneaded by the mixer the alcohol and/or amine (and catalyst if used) may be added, and the mixing continued until the desired degree of reaction is achieved.

A more preferred method is a continuous process in which the first polymer, alcohol and/or amine, and catalyst (if present) are fed to, heated, mixed, and allowed to react in a single or twin screw extruder or similar apparatus. The screw configuration is preferably chosen to uniformly mix the various ingredients to ensure that a uniform second polymer is produced. The screw design should provide for one or more reaction zones designed to minimize loss of the unreacted olefinically unsaturated compounds. The temperature and residence time in the extruder are controlled such that the desired degree of reaction is obtained. In the extruder, vacuum sections or ports may be used to remove the byproduct alcohol $R^2OH$, and may also be used to remove unreacted olefinically unsaturated alcohol and/or primary amine from the product polymer at the exit end of the extruder. Typical residence times in an extruder are about 20 sec. to about 5 min, preferably 1 to 2 min, with additional residence time up to about 20 min (if desired) in heated pipes and/or melt pumps.

The second polymer is then cured using a conventional sulfur or peroxide cure for unsaturated (olefinic) polymers. The first polymer (before reaction) and/or the second polymer may contain other ingredients normally present in thermoplastics or elastomers, so long as they do not interfere with the amidation/transesterification if present in the first polymer or the curing if present in the second polymer. For example, large amounts of oils are usually not present when peroxide cures are employed, since they often slow down and/or interfere with the cure. These materials may include fillers/reinforcing agents such as carbon black, clay, talc, glass fiber and silica, pigments or coloring agents such as calcium sulfate and $TiO_2$, antioxidants, antioxonants, oils, plasticizers, release agents, etc. Peroxide cures often employ coagents such as triallyl iscyanurate or "HVA-2" (m-phenylene-bis-maleimide), trimethylolpropane trimethacrylate, trimethylolpropane acrylate, and triallyl cyanurate to speed the cure and/or improve the properties of the vulcanizate.

The crosslinked polymer produced by the process described herein is novel. Also novel are compositions containing the second polymer and a sulfur cure system or a peroxide cure system.

Blends of the first polymer and the second polymer may also be made and then cured using a sulfur or peroxide curing system, preferably a peroxide curing system. It is preferred that in such blends the second polymer is at least about 20 weight percent of the polymer present, based on the total amount of first and second polymers present. Surprisingly, even with the blend containing less of the olefinic unsaturated containing component, the polymers still cure rapidly and give vulcanizates with good properties.

Vulcanizates of the second polymer have good properties, but, similar to the product of all curing reactions these properties may vary depending on the cure used and the starting polymer composition. A good test for the stability of the crosslinks formed is compression set at a given temperature. In this type of a test a (usually cured) polymer part is subjected to compression stress while being heated to a certain temperature. After a given period of time the stress is released, and the part cooled. The amount of the strain that the part does not recover is the compression set, and the lower the number the more stable the crosslinks are to rearrangement or simply being destroyed. This test is particularly important for parts that are to be used under compression, such as seals and gaskets.

It has been found that aside from the particular curing system used, the proportions of reacted and unreacted alcohol or amine in the second polymer greatly affect the compression set thereof. When the molar percentage of reacted alcohol or amine is relatively high the compression set is lower. Thus it is preferred that the second polymer contain more than about 70 mole percent, more preferably more than about 80 mole percent, especially preferably more than about 90 mole percent of reacted olefinically unsaturated alcohol or primary amine. A higher level of reaction can be achieved by subjecting the molten polymer to a vacuum, for instance a vacuum section in an extruder. The proportions of reacted and unreacted alcohol and/or amine can be determined by NMR spectroscopy (see below).

It has also been found that if the first polymer is dried before being reacted with the olefinically unsaturated alcohol and/or amine that the amount of unreacted alcohol and/or amine in the second polymer is reduced. It is therefore preferred to dry the first polymer before this reaction. Before drying, the polymer may contain about 0.2 to 0.8% water. The polymer can be dried in a vacuum oven: overnight drying at 80° C., with a vacuum and slow nitrogen purge, can reduce the water content to about 0.01%, which can rise to about 0.05% after exposure to ambient conditions for a day or two. The polymer can also be dried by passing it through an extruder, without any other ingredients, while pulling a vacuum on vent ports placed over two or more of the extruder zones. The screw can be run at 200–250 rpm or any convenient speed, and the temperature profile adjusted so that the polymer's exit temperature is about 200° C. Under these conditions, the moisture content can be reduced to about 0.01–0.02%. The drying may also be accomplished at the back (feed) end of the extruder before introduction of the olefinically unsaturated compound and catalyst (if used). After heating the polymer in the first few zones of the extruder, the moisture is removed at a vent port, followed by a melt seal designed to separate the drying process from the transesterification or transamidation taking place in the next zones of the extruder. The melt seal can consist of a blister ring or reverse elements incorporated into the extruder screws.

In order to achieve low compression set it has been found that a minimum level of reacted olefinically unsaturated alcohol and/or primary amine should be present in the second polymer. This is especially true when a sulfur cure system is used. Preferably there should be 30 mmol/100 g of second polymer or more, more preferably about 35 mmol/100 g of second polymer or more of reacted olefinically unsaturated alcohol and/or primary amine present. A combination of low unreacted olefinically unsaturated alcohol and/or primary amine, and the minimum preferred amount of reacted olefinically unsaturated alcohol and/or primary amine often leads to the best (lowest) compression sets and/or fast cure rate.

In another preferred composition of the second polymer it is preferred that at least about 0.5 mole percent, preferably at least about 1.0 mole percent, and especially preferably at least about 2.0 mole percent of $R^2$ contain olefinic unsaturation.

EXAMPLE

A Brabender Plasticorder®. (C. W. Brabender Instruments, Inc., South Hackensack, N.J., U.S.A.) equipped with a 3-piece Prep Mixer® and roller blades in a 350 ml cavity is pre-heated to 200° C. Under a nitrogen blanket, with roller blades turning at reduced speed, 225 g of polyethyl acrylate elastomer and 25.0 g of ω-undecylenyl alcohol are added to the Brabender. The speed of the roller blades is increased to 75 rpm and mixing is allowed to continue until the temperature again rises to 200° C., in about 10 min. With the reactants at 200° C., 2.1 ml of 25% (w/w) titanium tetra-n-butoxide in 1,2,3,4-tetramethylbenzene is added gradually, and the mixing is allowed to continue for an additional 20 min. Then the mixer blades are stopped, the head disassembled, and the product discharged. Some of the ethyl groups are replaced by the unsaturated hydrocarbyl groups of the ω-undecylenyl alcohol. In the theoretical limit (if 100% of the alcohol is reacted), 6.5% of the ethyl groups are replaced.

100 g of the product obtained above is sulfur-cured by first compounding on a rubber mill with 5 g of zinc oxide, 1 g of stearic acid, 1 g of Naugard® 445 4,4'-Bis (alpha,alpha-dimethylbenzyl) diphenylamine, 60 g of SRF N-774 semi-reinforcing furnace black, 1.5 g of sulfur, 0.5 g of 2-mercaptobenzothiazole, and 1.5 g of Thionex® tetramethyl thiuram monosulfide, followed by press-curing the resulting compound for 20 min at 160° C.

For the compression set test, compression set pellets are press cured for 20 min at 160° C. and some of them are additionally post-cured in an oven for 4 hrs at 160° C. A control sample is prepared on the rubber mill from polyethyl acrylate and the same sulfur-compound-based recipe and is similarly cured and pellets similarly cured and optionally post-cured. The composition of the invention exhibits a greater state of cure than the control with a higher percentage of insolubles in solvents like acetone, and better compression set resistance.

A second 100 g aliquot of the product obtained from the Brabender as hereinabove described, is peroxide cured by first compounding on a rubber mill with 0.5 g of Vanfre® VAM polyoxyethylene octadecyl ether phosphate, 0.5 g of Armeen® 18D octadecyl amine, 1.5 g of stearic acid, 1.0 g of Naugard® 445, 65 g of SRF Black, N-774, 5.0 g of TP-759 polyether/ester plasticizer, 2.5 g of Vulcup® R 2,2-bis(t-butylperoxy)diisopropyl benzene, and 1.0 g of HVA-2 N,N'-m-phenylene dimaleimide, followed by press curing for 15 min at 177° C.

For the compression set test, compression set pellets are press cured for 15 min at 177° C. and some of them are additionally post-cured in an oven for 4 hrs at 177° C. A control sample is prepared on the rubber mill from polyethyl acrylate and the same peroxide-type curing recipe as described above and is similarly cured and pellets similarly cured and optionally post-cured. Oscillating disk rheometer data (ASTM D2084) shows that the product prepared in the Brabender is cured faster than the second polyethyl acrylate control sample, which contains no unsaturation attached to the polymer. The composition prepared from the product made in the Brabender exhibits a greater state of cure than the second control—it has better compression set resistance than the control.

What is claimed is:

1. A process for crosslinking a polymer, comprising:
   (a) transesterifying or amidating a first polymer consisting essentially of about 60 or more mole percent of

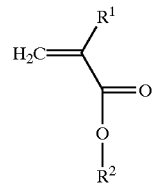

(I)

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, with an alcohol or a primary amine which contains one or more olefinic bonds, to form a second polymer having side chains containing said olefinic bonds; and (b) crosslinking said second polymer using a sulfur or peroxide cure system; and wherein:
   $R^1$ is methyl or hydrogen; and
   $R^2$ is hydrocarbyl, substituted hydrocarbyl, or a mixture thereof.

2. The process as recited in claim 1 wherein said first polymer is an elastomer.

3. The process as recited in claim 2 wherein each $R^2$ is independently alkyl containing 1–8 carbon atoms optionally substituted by one or more ether oxygens.

4. The process as recited in claim 3 wherein $R^1$ is hydrogen and each $R^2$ is independently selected from the group consisting of ethyl, butyl, methoxyethyl, ethoxyethyl, and mixtures thereof, with the proviso that at least 50 mol % of the $R^2$ groups must be ethyl, butyl, or a combination thereof.

5. The process as recited in claim 1 wherein said comonomer is acrylonitrile.

6. The process as recited in anyone of claim 1, 2, 4 or 5 wherein a transesterification is carried out.

7. The process as recited in claim 6 wherein a transesterification catalyst is present.

8. The process as recited in claim 7 wherein said catalyst is a tetraalkyl titanate or a tin compound.

9. The process as recited in claim 6 wherein said alcohol has the formula $HR^3(CR^4{=}CR^5R^6)_tCH_2OH$ wherein $R^3$ and each $R^5$ are each independently a covalent bond, alkylene or alkylidene, and $R^4$ and $R^6$ are each independently hydrogen or alkyl, and t is 1, 2 or 3.

10. The process as recited in claim 6 wherein said alcohol is one or more of oleyl, linoleyl or linolenyl alcohols.

11. The process as recited in claim 1 wherein during (b) said first polymer is also present, provided that said second polymer is at least 20% by weight of the total of said first polymer and said second polymer.

12. A composition comprising:
   (a) a second polymer made by transesterifying or amidating a first polymer consisting essentially of about 60 or more mole percent of

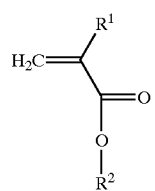

(I)

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, with an alcohol or a primary amine which contains one or more olefinic bonds; and (b) a sulfur or peroxide cure system; and wherein:
  $R^1$ is methyl or hydrogen; and
  $R^2$ is hydrocarbyl and/or substituted hydrocarbyl.

13. The composition as recited in claim 12 wherein said first polymer is an elastomer.

14. The composition as recited in claim 13 wherein each $R^2$ is independently alkyl containing 1–8 carbon atoms optionally substituted by one or more ether oxygens.

15. The composition as recited in claim 14 wherein $R^1$ is hydrogen and each $R^2$ is independently selected from the group consisting of ethyl, butyl, methoxyethyl, ethoxyethyl, and mixtures thereof, with the proviso that at least 50 mol % of the $R^2$ groups must be ethyl, butyl, or a combination thereof.

16. The composition as recited in claim 13 wherein said comonomer is acrylonitrile.

17. The composition as recited in claim 12 further comprising up to 80% by weight of a polymer consisting essentially of at least 60 mole percent of

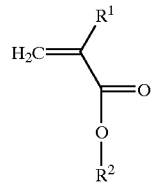

(I)

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, and wherein $R^1$ is methyl or hydrogen; and $R^2$ is hydrocarbyl, substituted hydrocarbyl, or a mixture thereof.

18. A composition comprising:
 (a) a polymer consisting essentially of at least 60 mole percent of

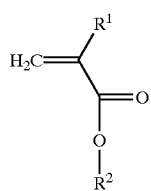

(I)

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons; and
 (b) a sulfur or peroxide cure system; wherein:
  $R^1$ is methyl or hydrogen; and $R^2$ is hydrocarbyl, substituted hydrocarbyl, or a mixture thereof, provided that at least 0.5 mole percent of $R^2$ contains olefinic unsaturation.

19. The composition as recited in claim 18 wherein said polymer is an elastomer.

20. The composition as recited in claim 19 wherein each $R^2$ which does not contain olefinic unsaturation is independently alkyl containing 1–8 carbon atoms optionally substituted by one or more ether oxygens.

21. The composition as recited in claim 20 wherein $R^1$ is hydrogen and $R^2$ which does not contain unsaturation is selected from the group consisting of ethyl, butyl, methoxyethyl, ethoxyethyl, and mixtures thereof.

22. The composition as recited in claim 19 wherein said polymer consists essentially of 100 mol % of (I).

23. The composition as recited in claim 18 further comprising up to 80% by weight of a polymer consisting essentially of about 60 or more mole percent of

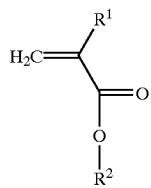

(I)

and up to about 40 mole percent of one or more comonomers selected from the group consisting of aromatic hydrocarbon olefins, acrylonitrile, olefinic monomers containing one or more functional groups selected from the group consisting of chlorine, epoxy, and carboxylic acid, and cyanoalkyl acrylates wherein alkyl comprises 2–8 carbons, and wherein $R^1$ is methyl or hydrogen; and $R^2$ is hydrocarbyl, substituted hydrocarbyl, or a mixture thereof; provided that none of $R^2$ contains olefinic unsaturation.

24. The process as recited in anyone of claim 1 or 6 wherein said first polymer is dried before step (a).

25. The product of the process in anyone of claim 1, 6 or 7.

* * * * *